(12) United States Patent
Tung

(10) Patent No.: US 8,476,551 B2
(45) Date of Patent: Jul. 2, 2013

(54) LASER CUTTING APPARATUS

(75) Inventor: Tsai-Shih Tung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1045 days.

(21) Appl. No.: 12/407,117

(22) Filed: Mar. 19, 2009

(65) Prior Publication Data

US 2009/0236322 A1   Sep. 24, 2009

(30) Foreign Application Priority Data

Mar. 20, 2008   (CN) .......................... 2008 1 0300642

(51) Int. Cl.
  *B23K 26/02*   (2006.01)
  *B29D 11/00*   (2006.01)
  *B28B 11/12*   (2006.01)

(52) U.S. Cl.
  USPC ............ 219/121.67; 219/121.82; 219/121.78; 264/2.7; 425/315; 425/316; 425/808; 269/57

(58) Field of Classification Search
  USPC ..................... 425/174.4; 219/121.67, 121.72, 219/121.82, 121.78; 264/157, 161; 269/289 R, 269/138, 291, 136; 118/724, 725
  See application file for complete search history.

(56) References Cited

U.S. PATENT DOCUMENTS

| | | | | |
|---|---|---|---|---|
| 4,114,910 A | * | 9/1978 | Reeder | 279/123 |
| 5,338,363 A | * | 8/1994 | Kawata et al. | 118/725 |
| 6,000,600 A | * | 12/1999 | Erikson et al. | 228/212 |
| 2004/0070117 A1 | * | 4/2004 | Wilsterman et al. | 264/442 |
| 2004/0159967 A1 | * | 8/2004 | Farnworth | 264/71 |
| 2008/0047120 A1 | * | 2/2008 | Soroka et al. | 29/27 C |

FOREIGN PATENT DOCUMENTS

| | | |
|---|---|---|
| JP | H7-1519 A | 1/1995 |
| JP | H7-80895 A | 3/1995 |
| JP | 3552768 B2 | 8/2004 |
| JP | 2006-320956 A | 11/2006 |
| TW | 200721938 A | 6/2007 |

* cited by examiner

*Primary Examiner* — Henry Yuen
*Assistant Examiner* — Diallo I Duniver
(74) *Attorney, Agent, or Firm* — Altis Law Group, Inc.

(57) ABSTRACT

An exemplary cutting apparatus for cutting components from a sprue includes a sprue retainer, a laser cutting unit, and a rotating driving unit. The sprue retainer has a supporting surface. The supporting surface defines a receiving hole, and grooves extending across the entire supporting surface. The grooves are in communication with the receiving hole. The laser cutting unit is disposed above the sprue retainer and is configured for emitting a laser beam to cut the sprue carried on the sprue retainer. The sprue retainer is coupled to the rotating driving such that the rotating driving unit is capable of driving the sprue retainer to rotate.

8 Claims, 5 Drawing Sheets

LASER CUTTING APPARATUS

BACKGROUND

1. Technical Field

The present invention relates to cutting apparatuses, and particularly to a cutting apparatus for cutting components from a sprue.

2. Related Art

Nowadays, plastic lenses are becoming more and more popular, particular in micro imaging apparatuses (e.g., lens modules widely used in mobile phones). This is due in large part to plastic lenses being highly suitable for mass production, enabling simple manufacturing processes and low manufacturing costs. Generally, plastic lenses are made using an injection molding process. To improve manufacturing efficiency, an injection mold may include two, fourth, eight or even more molding cavities for molding multiple plastic lenses in a single cycle. Such injection mold needs a multi-branch passage for providing molten plastic to the molding cavities. After a molding process, the plastic in the molding cavities forms a number of lenses. However, the plastic in the multi-branch passage is also solidified, thereby forming a multi-branch sprue that is connected to the lenses.

A simple way to separate each lens and the sprue is to cut off the lens from the sprue using a cutting tool (e.g., a scissor). However, a high shear force must be applied onto a periphery of the lens to cut off the lens, and the shear force may cause a stress concentration in the lens. As a result, the refractive index in different areas of the lens may become altered, and thereby an imaging quality of the lens is diminished. In addition, the cutting process may produce a plurality of small plastic waste particles, and these plastic particles are liable to pollute the obtained lens. Thus, an additional washing process is required. The washing process is time-consuming, and also decreases a yield rate of the lenses.

What is needed, therefore, is a cutting apparatus which is capable of overcoming the aforementioned problems.

BRIEF DESCRIPTION OF THE DRAWINGS

Many aspects of the present cutting apparatus can be better understood with reference to the following drawings. The components in the drawings are not necessarily drawn to scale, the emphasis instead being placed upon clearly illustrating the principles of the present cutting apparatus.

DETAILED DESCRIPTION OF EMBODIMENTS

Figure 4A:
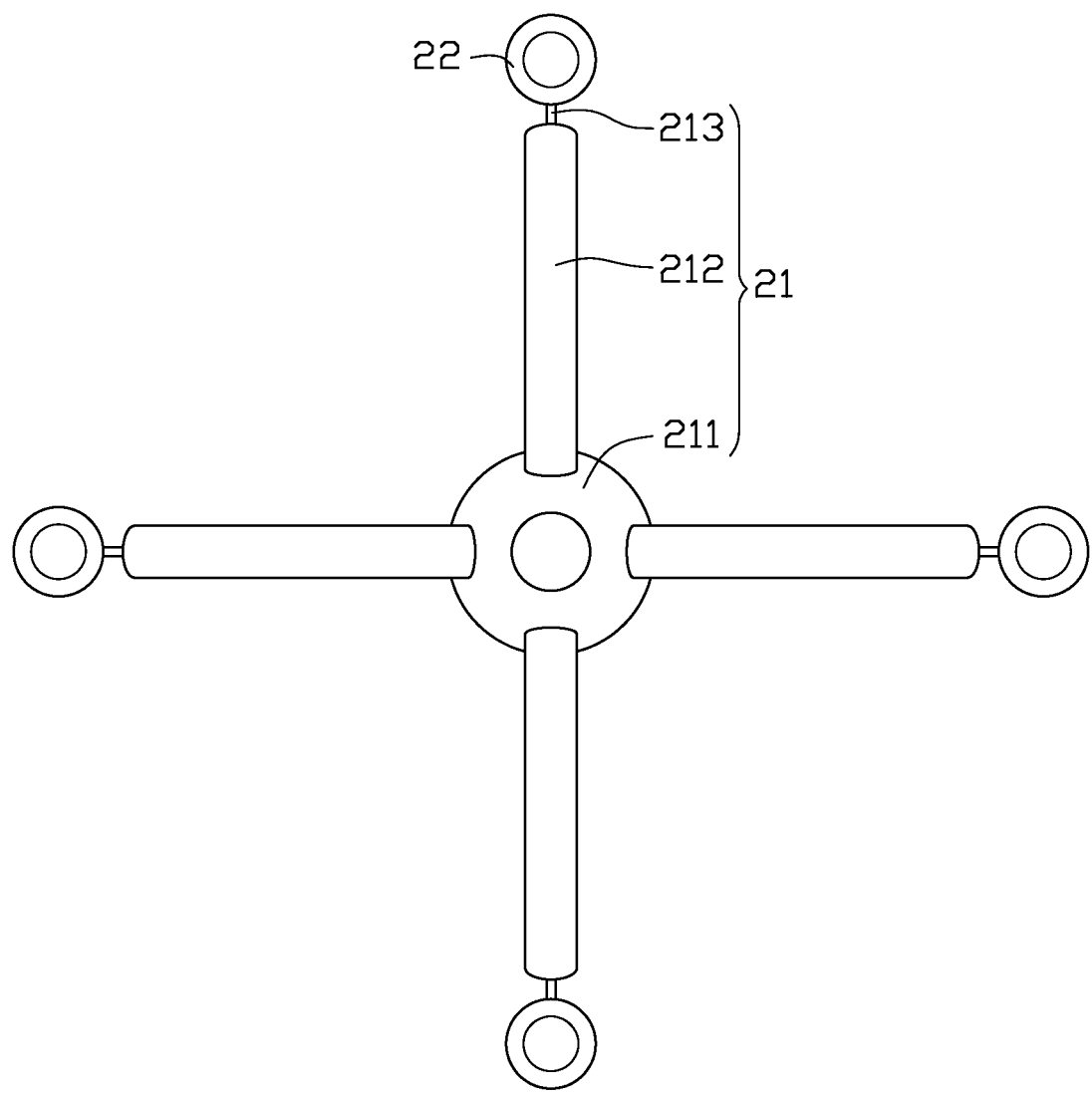
FIG. 4A is a top plan view of the whole sprue with lenses of FIG. 2.
Figure 4B:
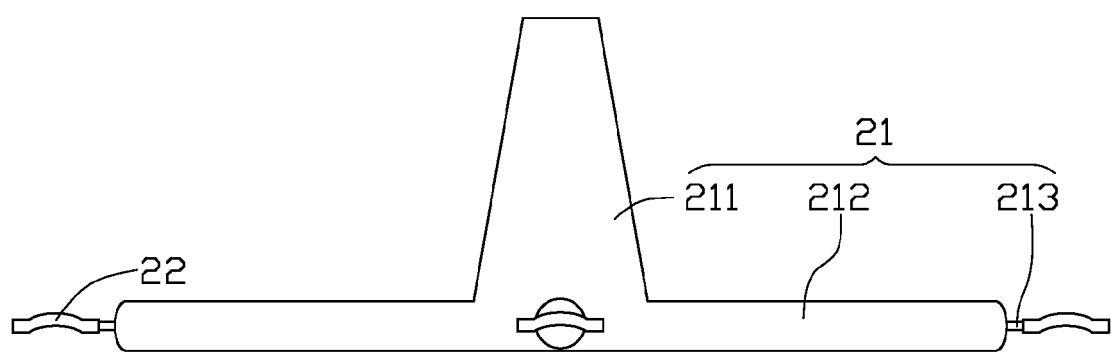
FIG. 4B is a side plan view of the sprue with lenses of FIG. 4A, showing the sprue with lenses inverted.

As shown in FIGS. 4A and 4B, a sprue 21 includes a main portion 211, four branch portions 212 perpendicularly extending from the main portion 211, and four sprue gate portions 213 respectively collinearly extending in a direction away from a corresponding branch portion 212. A lens 22 is formed at a distal end of each sprue gate portion 213. The branch portions 212 are angularly evenly arranged around the main portion 211. Thus, the four branch portions 212 constitute a cross-like structure.

Typically, the sprue 21 with lenses 22 is made using an injection mold. It is understood that the structure of the sprue 21 corresponds to a runner system in an injection mold. For example, after a cooling process, the plastic in the main runner forms the main portion 211, the plastic in the branch runners forms the branch portions 212, and the plastic in the sprue gate forms the sprue gate portions 213.

Figure 1:
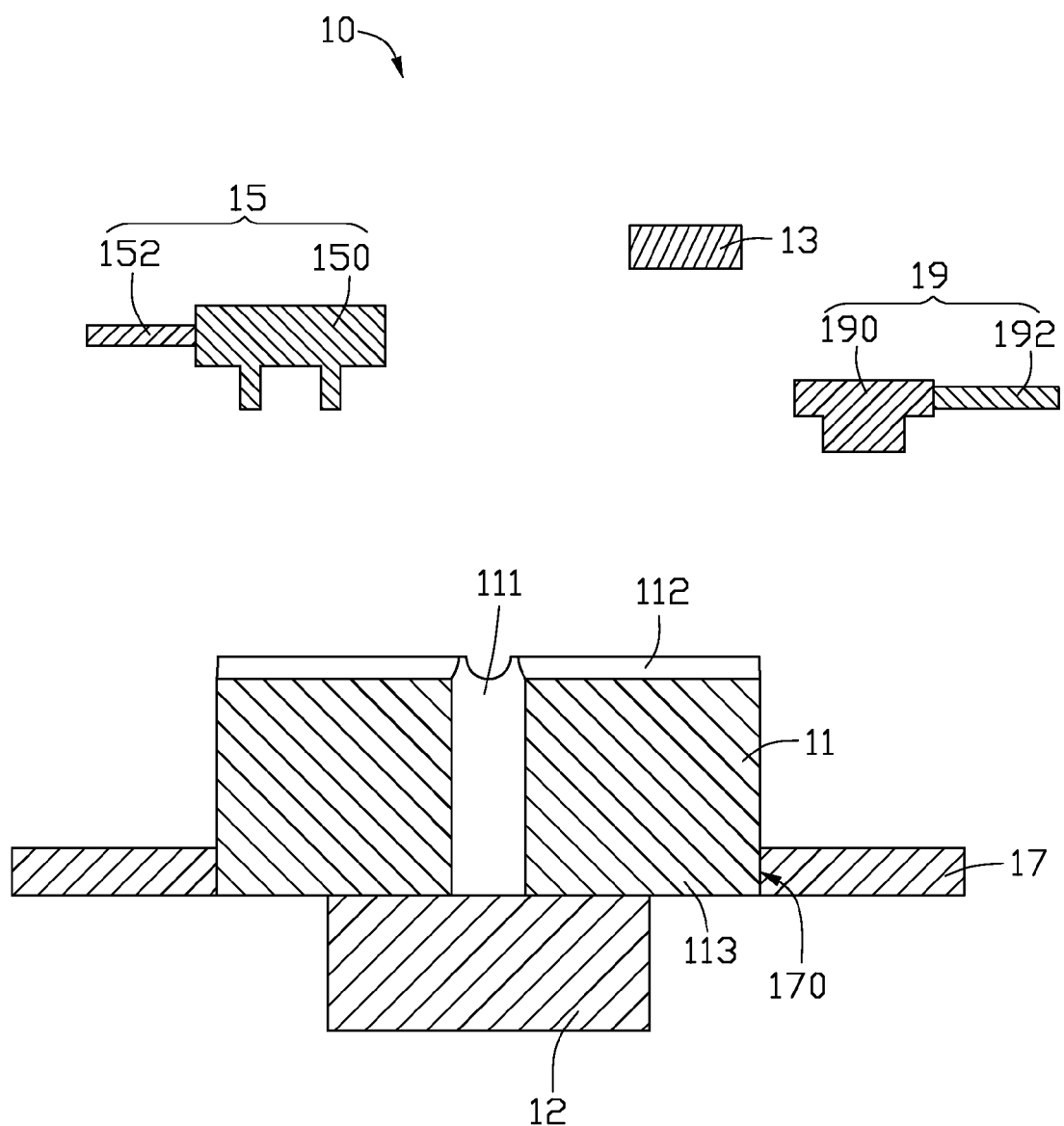
FIG. 1 is a schematic, cross-sectional view of a cutting apparatus in according with one embodiment.
Figure 2:
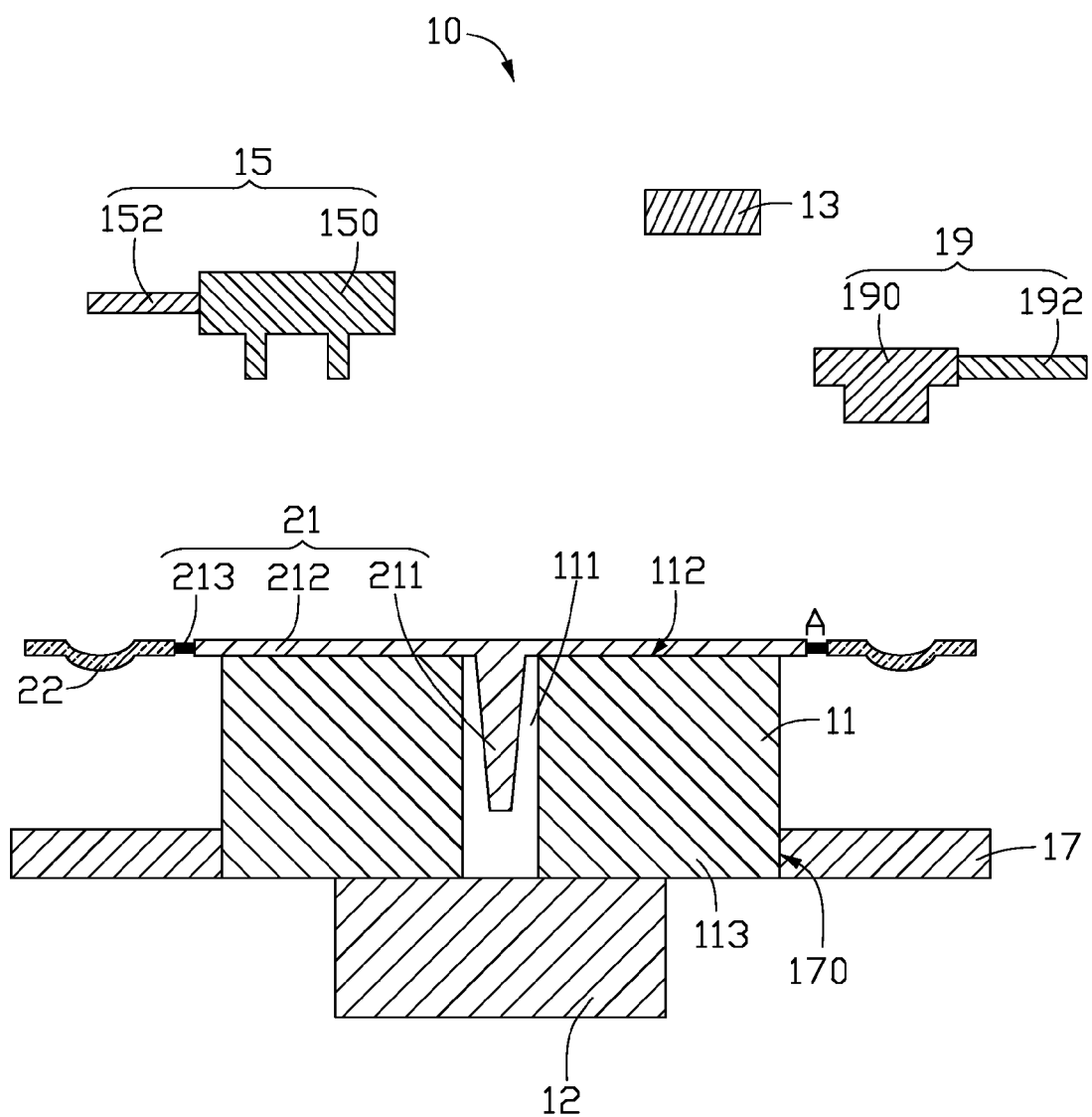
FIG. 2 is similar to FIG. 1, but showing a sprue with lenses placed on the cutting apparatus.

Referring also to FIGS. 1 and 2, a cutting apparatus 10 in accordance with one embodiment includes a sprue retainer 11, a rotating driving unit 12, and a laser cutting unit 13.

Figure 3:
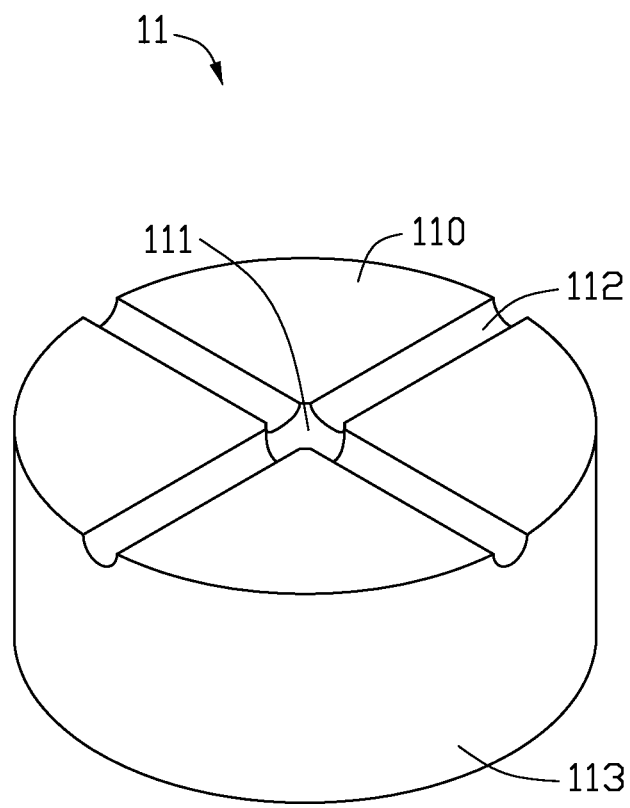
FIG. 3 is a schematic, isometric view of a sprue retainer of the cutting apparatus of FIG. 1.

As shown in FIG. 3, the sprue retainer 11 is cylindrical, and has a top supporting surface 110 and a bottom portion 113. The supporting surface 110 defines two grooves 112, which span across the entire diameter of the supporting surface 110. The two grooves 112 are perpendicular to each other and bisect each other. A receiving hole 111 is defined along a vertical central axis of the sprue retainer 11. The receiving hole 111 is in communication with an intersecting area of the two grooves 112. The receiving hole 111 can be a blind hole or a through hole. In the present embodiment, the receiving hole 111 is a through hole that extends from the supporting surface 110 to a bottom extremity of the bottom portion 113.

The rotating driving unit 12 can be a motor or a revolving cylinder, and has a driving shaft (not shown). The sprue retainer 11 is fixed to the driving shaft. Thus the rotating driving unit 12 can drive the sprue retainer 11 to rotate about the central axis of the sprue retainer 11.

The laser cutting unit 13 is positioned above a side of the sprue retainer 11, and can emit a laser beam to a desired location.

The cutting apparatus 10 further includes a sprue supplying unit 15, which has an actuating arm 152 and a clamper 150 attached to the actuating arm 152. The clamper 150 is configured for clamping the sprue 21, and the actuating arm 152 is configured for moving the clamper 150 to a predetermined position above the sprue retainer 11.

In a cutting process using the cutting apparatus 10, the clamper 150 is controlled to clamp the sprue 21. Then the clamper 150, the sprue 21, and the lenses 22 attached to the sprue 21 are moved to a predetermined position above the sprue retainer 11 using the actuating arm 152. After that, the sprue 21 is placed on the sprue retainer 11 and the clamper 150 is released. The main portion 211 is received in the receiving hole 111, and the branch portions 212 are received in the grooves 112. As such, the sprue 21 is held on the sprue retainer 11. The lenses 22 are outside the sprue retainer 11. It is understood that the number and distribution of the grooves 112 correspond to or are at least compatible with the number and distribution of the branch portions 212.

In addition, the sprue retainer 11 can be driven to rotate by the rotating driving unit 12. Because the branch portions 212 are received in the grooves 112 of the supporting surface 110 of the sprue retainer 11, the sprue 21 can rotate together with the sprue retainer 11. If the sprue 21 rotates to a predetermined position such that a lens 22 is at a predetermined position A (see FIG. 2), the laser cutting unit 13 emits a laser beam onto the sprue gate portion 213 corresponding to the lens 22, thereby cutting off the lens 22 from the sprue gate portion 213.

All the lenses 22 can be successively rotated to the predetermined position A by driving the rotating driving unit 12. As such, all the lenses 22 can be cut off from corresponding sprue gate portions 213 at the predetermined position A. It is not necessary to adjust a position of the laser cutting unit 13.

Each lens 22 falls off when it is cut off. To avoid scratching of the lenses 22, the cutting apparatus 10 may further include a collecting unit 17 made of a soft material for collecting the lenses 22 cut off from the sprue 21. Examples of the soft material include plastic and rubber. The collecting unit 17 is annular, and is positioned around the sprue retainer 11. The collecting unit 17 has a central hole 170. A bottom portion 113 of the sprue retainer 11 is received in the central hole 170. As such, the sprue retainer 11 is rotatably disposed in the central hole. The collecting unit 17 is fixed.

Additionally, the cutting apparatus 10 may further include a vacuum suction unit 19, for transferring the lenses 22 collected in the collecting unit 17 to an adjacent area to perform subsequent processing such as polishing (or washing). The vacuum suction unit 19 has an actuating arm 192 and a suction mouth 190. An end of suction mouth 190 is fixed to the actuating arm 192, and another end of the suction mouth 190 has a flexible vacuum pad (not labeled). The suction mouth 190 is also connected to a vacuum pump. Each lens 22 can be picked up by the flexible vacuum pad. Thus, the lenses 22 in the collecting unit 17 can be transferred to the adjacent area by driving the actuating arm 192.

In the cutting apparatus 10, the sprue gate portions 213 in the sprue 21 are cut by the laser beam emitted by the laser cutting unit 13. It is known that laser cutting has properties of high energy density, high speed, and low thermal shock. Moreover, there is no cutting tool that contacts the sprue gate portions 213. As such, mechanical shock of the lenses 22 and stress concentration in the lenses 22 can be avoided, and a yield rate of the lenses 22 can be improved.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A cutting apparatus for cutting components from a sprue, the cutting apparatus comprising:
    a sprue retainer having a circular supporting surface, the supporting surface defining a central receiving hole and at least one groove, the at least one groove being in communication with the receiving hole, each of the at least one groove extending through the central receiving hole and a circumference of the circular supporting surface in a diameter direction of the circular supporting surface;
    a laser cutting unit disposed above the sprue retainer, the laser cutting unit configured for emitting a laser beam to cut a sprue carried on the sprue retainer;
    a rotating driving unit, the sprue retainer being coupled to the rotating driving unit such that the rotating driving unit is capable of driving the sprue retainer to rotate;
    a collecting unit placed around the sprue retainer for collecting optical components cut from the sprue, the collecting unit comprising soft material positioned for cushioning the optical components cut from the sprue, the soft material being plastic;
    a sprue supplying unit having an actuating arm and a clamper attached to the actuating arm, the clamper being configured for clamping the sprue, and the actuating arm being configured for driving the clamper to move to a predetermined position above the sprue retainer.

2. The cutting apparatus of claim 1, wherein the at least one groove comprises two mutually bisecting grooves, the receiving hole communicating with the two grooves at an intersecting area of the two grooves.

3. The cutting apparatus of claim 2, wherein the sprue retainer is cylindrical.

4. The cutting apparatus of claim 1, further comprising a vacuum suction unit configured for picking up the components that have been cut from the sprue.

5. A cutting apparatus for cutting components from a sprue, the cutting apparatus comprising:
    a sprue retainer having a circular supporting surface, the supporting surface defining a central receiving hole and at least one groove, the at least one groove being in communication with the receiving hole, each of the at least one groove extending through the central receiving hole and a circumference of the circular supporting surface in a diameter direction of the circular supporting surface;
    a laser cutting unit disposed above the sprue retainer, the laser cutting unit configured for emitting a laser beam to cut a sprue carried on the sprue retainer;
    a rotating driving unit, the sprue retainer being coupled to the rotating driving unit such that the rotating driving unit is capable of driving the sprue retainer to rotate;
    a collecting unit placed around the sprue retainer for collecting optical components cut from the sprue, the collecting unit comprising soft material positioned for cushioning the optical components cut from the sprue, the soft material being rubber;
    a sprue supplying unit having an actuating arm and a clamper attached to the actuating arm, the clamper being configured for clamping the sprue, and the actuating arm being configured for driving the clamper to move to a predetermined position above the sprue retainer.

6. The cutting apparatus of claim 5, wherein the at least one groove comprises two mutually bisecting grooves, the receiving hole communicating with the two grooves at an intersecting area of the two grooves.

7. The cutting apparatus of claim 6, wherein the sprue retainer is cylindrical.

8. The cutting apparatus of claim 5, further comprising a vacuum suction unit configured for picking up the components that have been cut from the sprue.

* * * * *